(12) United States Patent
Nakagawa et al.

(10) Patent No.: US 6,914,393 B2
(45) Date of Patent: Jul. 5, 2005

(54) METHOD AND DEVICE FOR LIGHTING HIGH PRESSURE DISCHARGE LAMPS

(75) Inventors: Atsuji Nakagawa, Himeji (JP); Toshitaka Fujii, Himeji (JP)

(73) Assignee: Phoenix Electric Co., Ltd., Hyogo (JP)

( * ) Notice: Subject to any disclaimer, the term of this patent is extended or adjusted under 35 U.S.C. 154(b) by 0 days.

(21) Appl. No.: 10/636,872

(22) Filed: Aug. 7, 2003

(65) Prior Publication Data

US 2004/0085027 A1 May 6, 2004

(30) Foreign Application Priority Data

Nov. 6, 2002 (JP) ........................................ 2002-322185

(51) Int. Cl.[7] .............................. H05B 41/16; G05F 1/00
(52) U.S. Cl. ....................................... 315/246; 315/291
(58) Field of Search .................................. 315/821, 291, 315/307, 309, 224, DIG. 7, 246

(56) References Cited

U.S. PATENT DOCUMENTS

| | | | | |
|---|---|---|---|---|
| 4,665,346 A | * | 5/1987 | Tarroux | ....................... 315/289 |
| 5,485,061 A | * | 1/1996 | Ukita et al. | .................. 315/307 |
| 6,291,945 B1 | * | 9/2001 | Toyama et al. | ............. 315/307 |
| 6,392,364 B1 | * | 5/2002 | Yamamoto et al. | ......... 315/291 |
| 6,700,335 B2 | * | 3/2004 | Prasad | ......................... 315/307 |
| 6,747,422 B2 | * | 6/2004 | Yamamoto et al. | ......... 315/307 |

FOREIGN PATENT DOCUMENTS

WO    WO 95/35645    12/1995

* cited by examiner

*Primary Examiner*—Don Wong
*Assistant Examiner*—Minh Dieu A
(74) *Attorney, Agent, or Firm*—Jordan and Hamburg LLP

(57) ABSTRACT

Improved method and device for lighting a high pressure discharge lamp are provided which prevent arc jump and inhibit deterioration of lamp voltage and luminance. The method includes the step of: alternately repeating a superposition operation for superposing a pulse current on a lamp current applied to the high pressure discharge lamp for a predetermined time period and a superposition stopping operation for stopping the superposition of the pulse current for a predetermined time period.

5 Claims, 8 Drawing Sheets

(A) EARLY LIGHTING STAGE (B) SUPERPOSITION OPERATION (C) SUPERPOSITION STOPPING OPERATION (A) SUPERPOSITION OPERATION
(WITH ELECTRODE GROWTH)

ARC LENGTH DECREASE
LAMP VOLTAGE DROP (B) SUPERPOSITION STOPPING OPERATION
(WITH ELECTRODE CONSUMPTION)

ARC LENGTH INCREASE
LAMP VOLTAGE RISE

METHOD AND DEVICE FOR LIGHTING HIGH PRESSURE DISCHARGE LAMPS

BACKGROUND OF THE INVENTION

1. Field of the Invention

The present invention relates to method and device for lighting high pressure discharge lamps capable of preventing arc jump by superposing pulse current.

2. Description of the Related Art

High pressure discharge lamps such as ultra-high pressure discharge lamps or metal halide lamps are frequently used as light sources in optical information systems such as a liquid crystal projector. Recently, high pressure discharge lamps having a relatively short electrode gap (arc length) are being developed for enhancing the luminance and light utilization efficiency.

However, in a high pressure discharge lamp of such a short arc type, the tip end of an electrode is heated to a high temperature and consumed due to evaporation of tungsten. Therefore, when the lamp is continuously lighted for a long period of time, so-called arc jump (a phenomenon that the luminous point between the electrodes fluctuates) is likely to occur, causing luminance variation (flicker) on a screen. Therefore, in the development of a high pressure discharge lamp of the short arc type, the prevention of arc jump has been a significant technical challenge.

As a measure to solve such a problem, a technique for preventing arc jump by superposing pulse current on rectangular alternating lamp current is disclosed in the gazette of JP-A-10-501919.

However, with this conventional technique, as the continuous use time of the high pressure discharge lamp becomes longer, the electrodes grow, so that the arc length becomes smaller. Therefore, the lamp voltage drops gradually, which makes it impossible to continue the lighting. Further, since the luminous point fluctuates as the electrodes grow, the optimum position relative to an optical component such as a reflector cannot be maintained, which may cause deterioration in luminance.

SUMMARY OF THE INVENTION

It is, therefore, an object of the present invention to provide a method and a device for lighting a high pressure discharge lamp which are capable of preventing arc jump by suppressing the consumption of electrodes and preventing the lamp voltage or luminance from deteriorating by inhibiting the growth of the electrodes.

In accordance with a first aspect of the present invention, there is provided a method of lighting a high pressure discharge lamp comprising the step of alternately repeating a superposition operation for superposing a pulse current on a lamp current applied to the high pressure discharge lamp for a predetermined time period and a superposition stopping operation for stopping the superposition of the pulse current for a predetermined time period.

It is to be noted that either of direct current and alternating current may be used as the lamp current to be applied to the high pressure discharge lamp. In both cases, the following effects or advantages can be obtained.

In the case where the lamp current is direct current, as the superposition operation continues, the tip end of the cathode electrode grows to form a projection and the lamp current drops gradually (see FIG. 4(B)). Then, the superposition operation is switched to the superposition stopping operation. As a result, the growth of the cathode electrode and the lamp voltage drop are inhibited, thereby keeping the lighting. Since the tip end of the cathode electrode has grown to form a projection, arc jump does not occur even when the superposition of the pulse current is stopped. As the superposition stopping operation continues thereafter, the tip end of the cathode electrode is consumed due to evaporation of tungsten, which increases the possibility that arc jump occurs (see FIG. 4(C)). Then, the superposition stopping operation is switched to the superposition operation to make the cathode electrode grow again. By alternately repeating the superposition operation and the superposition stopping operation in such a manner, the lifetime of the high pressure discharge lamp is prolonged and the luminance is maintained throughout the life of the lamp.

On the other hand, in the case where the lamp current is alternating current, as the superposition operation continues, tip ends of both electrodes grow to form projections and the lamp current drops gradually (see FIG. 8(A)). Then, the superposition operation is switched to the superposition stopping operation. As a result, the growth of the both electrodes and the lamp voltage drop are inhibited, thereby keeping the lighting. Since the tip ends of the both electrodes have grown to form respective projections, arc jump does not occur even when the superposition of the pulse current is stopped. As the superposition stopping operation continues thereafter, the tip ends of the both electrodes are consumed due to evaporation of tungsten, which increases the possibility that arc jump occurs (see FIG. 8(B)). Then, the superposition stopping operation is switched to the superposition operation to make the electrodes grow again. By alternately repeating the superposition operation and the superposition stopping operation in such a manner, the lifetime of the high pressure discharge lamp is prolonged and the luminance is maintained throughout the life of the lamp.

In one embodiment, the superposition operation is switched to the superposition stopping operation when a lamp voltage drops to reach a lower limit threshold value, while the superposition stopping operation is switched to the superposition operation when the lamp voltage rises to reach an upper limit threshold value which is higher than the lower limit threshold value.

With this method, switching between the superposition operation and the superposition stopping operation is carried out when the lamp voltage reaches a predetermined threshold value.

In accordance with another aspect of the present invention, there is provided a device for lighting a high pressure discharge lamp, comprising: a power source for supplying a lamp current to the high pressure discharge lamp; pulse superposing means for superposing a pulse current on the lamp current; and pulse ON/OFF means for performing switching between a pulse superposition operation performed by the pulse superposing means for a predetermined time period and a pulse superposition stopping operation performed for a predetermined time period with predetermined periodicity.

This device is capable of carrying out the method of the first aspect of the invention. In this device, the switching between the superposition operation and the superposition stopping operation is carried out by the pulse ON/OFF means.

In one embodiment, the pulse ON/OFF means switches the superposition operation to the superposition stopping operation when a lamp voltage reaches a predetermined lower limit threshold value and switches the superposition stopping operation to the superposition operation when the lamp voltage reaches a predetermined upper limit threshold value.

With this feature, the switching between the superposition operation and the superposition stopping operation is carried out based on the lamp voltage.

In another embodiment, the pulse ON/OFF means includes a timer and performs the switching between the superposition operation and the superposition stopping operation in accordance with an output from the timer.

With this feature, the switching between the superposition operation and the superposition stopping operation is carried out based on the elapsed time from a certain point of time.

The foregoing and other objects, features and attendant advantages of the present invention will become apparent from the reading of the following detailed description of the invention in conjunction with the accompanying drawings.

DETAILED DESCRIPTION OF THE PREFERRED EMBODIMENTS

The present invention will now be described in detail by way of preferred embodiments thereof with reference to the accompanying drawings.

Figure 1:
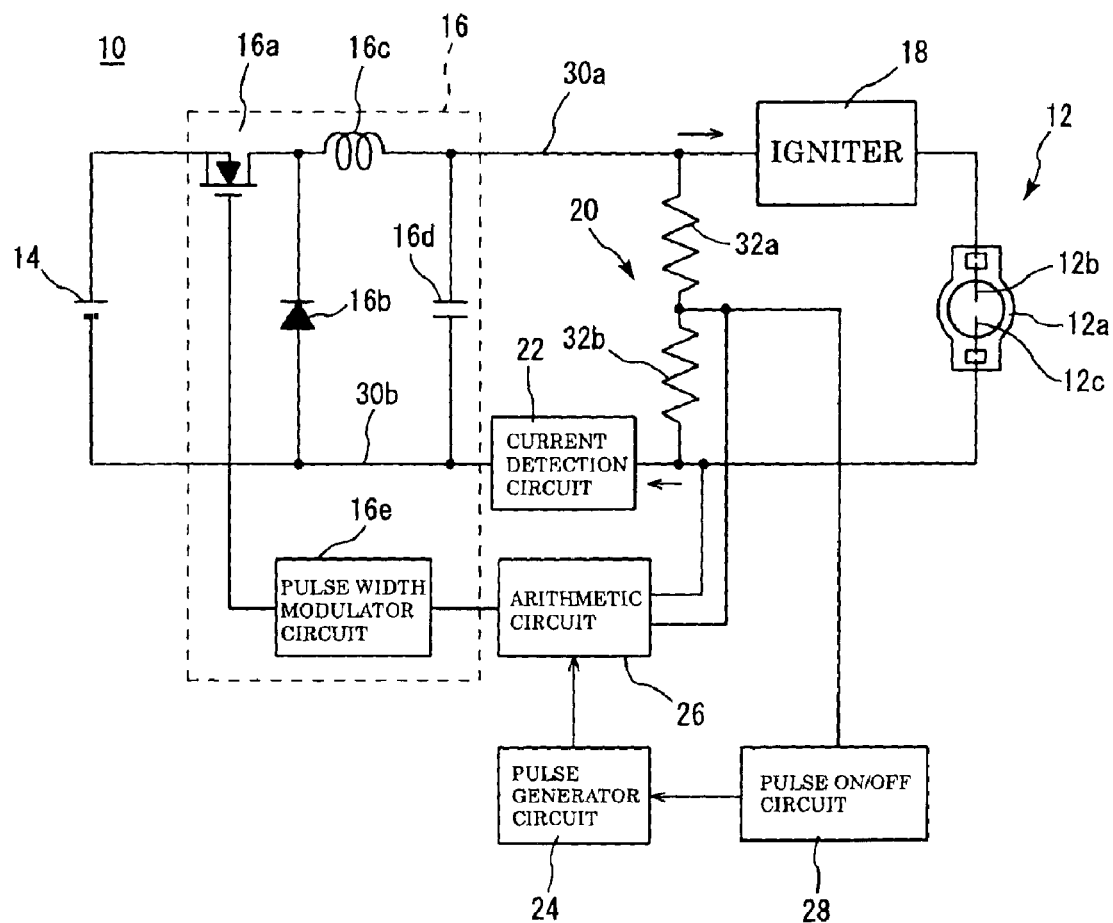
FIG. 1 is a block circuit diagram showing a first embodiment (DC lighting type) of the present invention.
Figure 2:
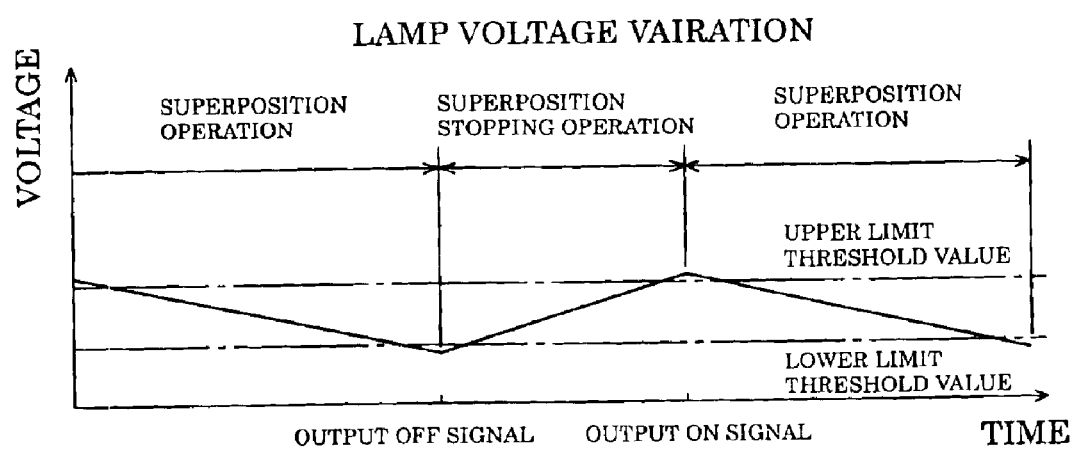
FIG. 2 is a graphic representation of a variation of lamp voltage.

Referring to FIG. 1, indicated by reference numeral 10 is a lighting device according to the present invention for lighting a high pressure discharge lamp 12 as a light source in an optical information system such as a liquid crystal projector.

The high pressure discharge lamp 12, which is a lamp for DC lighting in this embodiment, is of a short arc type (arc length=not more than 2 mm) close to a point light source such as an ultra-high pressure mercury lamp or a metal halide lamp. The high pressure discharge lamp includes an arc tube 12a having seal portions at opposite ends thereof, and an anode electrode 12b and a cathode electrode 12c disposed confronting each other in the arc tube 12a. The arc tube 12a encapsulates therein a rare gas, a metal halide, mercury, and other necessary materials. In the case of an ultra-high pressure mercury lamp, mercury of no less than 0.15 mg/mm$^3$ is filled for providing an internal pressure of no less than 15 MPa during the lighting.

The lighting device 10, which functions to light the high pressure discharge lamp 12 by direct current, comprises a DC power source 14, a down converter 16, an igniter 18, a voltage detection circuit 20, a current detection circuit 22, a pulse generator circuit 24, an arithmetic circuit 26, a pulse ON/OFF circuit 28 and the like.

The DC power source 14 applies a necessary DC voltage (generally no less than 200V) to the high pressure discharge lamp 12 to initiate the lighting and supplies a current for lighting to the high pressure discharge lamp 12 in a steady lighting period.

The down converter 16, which functions to drop an output voltage by chopping, comprises a typical voltage-drop chopper circuit of a switching power source type including a switching element 16a, a power diode 16b, a choke coil 16c, a smoothing capacitor 16d and a pulse width modulator circuit 16e.

The down converter 16 controls the current supplied from the DC power source 14 in a chopping fashion by the ON/OFF operation of the switching element 16a in accordance with a control signal outputted from the pulse width modulator circuit 16e. A square wave obtained by the chopping control is smoothed by the power diode 16b, the choke coil 16c and the smoothing capacitor 16d, so that an output voltage that is lower than the source voltage is obtained across the smoothing capacitor 16d.

The igniter 18 applies pulses of a high voltage to the high pressure discharge lamp 12 in initiating lighting of the lamp. The igniter 18 is connected in series with an output line 30a at the output side of the down converter 16.

The voltage detection circuit 20, which is a resistive potential divider circuit for measuring the lamp voltage, comprises resistors 32a and 32b connected in series with each other between the output line 30a and a 0V line 30b. The voltage at a connection point P between the resistors 32a and 32b is supplied to the arithmetic circuit 26 and the pulse ON/OFF circuit 28 as a lamp voltage signal.

The current detection circuit 22, which is a circuit for measuring a lamp current, comprises a non-illustrated resistor (generally not more than 1Ω) connected in series with the 0V line 30b, and the like. A voltage generated by the current passing through the resistor is supplied to the arithmetic circuit 26 as a lamp current signal.

The pulse generator circuit 24 generates a pulse superposition signal, which is a pulse wave for setting a repetition period (ts) and a pulse width (tp) of a pulse current to be superposed on the lamp current. During the steady lighting, such a pulse superposition signal is supplied to the arithmetic circuit 26 with certain periodicity. Instead of providing the pulse generator circuit 24 as an internal circuit of the lighting device 10 as in this embodiment, the pulse generator circuit 24 may be provided as an external circuit (not shown) of the lighting device 10.

The pulse ON/OFF circuit 28 controls the timing with which the pulse generator circuit 24 outputs the pulse superposition signal for performing switching between the pulse superposition operation and the pulse superposition stopping operation on the lamp current.

Specifically, when the lamp voltage having been kept higher than a predetermined lower limit threshold value (e.g. 50V, which is a generally possible value as a minimum lamp voltage of rated operating voltage), drops below the lower limit threshold value, the pulse ON/OFF circuit 28 supplies an OFF signal to the pulse generator circuit 24 to stop outputting of the pulse superposition signal. When the lamp voltage rises again and reaches a higher limit threshold value which is higher than the lower limit threshold value, the pulse ON/OFF circuit 28 supplies an ON signal to the pulse generator circuit 24 to resume outputting of the pulse superposition signal.

Therefore, when the pulse ON/OFF circuit 28 outputs an ON signal, the pulse superposition operation starts, whereas, when the pulse ON/OFF circuit outputs an OFF signal, the pulse superposition stopping operation starts. Thus, switching between the superposition operation and the superposition stopping operation is performed based on the lower limit threshold value and the upper limit threshold value.

In this way, the pulse ON/OFF circuit 28 in this embodiment serves as pulse ON/OFF means for performing switching between the superposition operation for a predetermined time period and the superposition stopping operation for a predetermined time period with predetermined periodicity.

The arithmetic circuit 26 receives the lamp voltage signal from the voltage detection circuit 20, the lamp current signal from the current detection circuit 22 and the pulse superposition signal from the pulse generator circuit 24 for generating an instruction signal.

Specifically, the arithmetic circuit 26 calculates the amount of current supply for constant power control over the high pressure discharge lamp 12 based on the lamp voltage signal and the lamp current signal, and calculates the pulse width, pulse height and superposition timing of a pulse current to be superposed on the lamp current. Then, the instruction signal is generated for controlling the switching element 16a so as to satisfy those calculation results, and the instruction signal is fed to the pulse width modulator circuit 16e.

It is to be noted that, for simplifying the structure of the circuit, a microcomputer may be used to serve as the arithmetic circuit 26.

The lighting of the high pressure discharge lamp 12 by the lighting device 10 is performed as follows. When the power switch (not shown) of the lighting device 10 is turned on, an initiating voltage (generally no less than 200V) is applied from the DC power source 14 to the high pressure discharge lamp 12, while a high voltage is applied to the high pressure discharge lamp 12 by the operation of the igniter 18. As a result, breakdown occurs between the anode electrode 12b and the cathode electrode 12c, causing glow discharge to start. Then, as thermionic current increases with rising electrode temperature, the lighting shifts from the glow discharge stage to the arc discharge stage, i.e. steady lighting stage. In synchronization with the timing of shift, igniter 18 is stopped.

In the steady lighting stage, the voltage detection circuit 20 generates the lamp voltage signal while the current detection circuit 22 generates the lamp current signal, which signals are then fed to the arithmetic circuit 26. Further, the pulse superposition signal generated at the pulse generator circuit 24 is fed to the arithmetic circuit 26 with predetermined periodicity.

Figure 3:
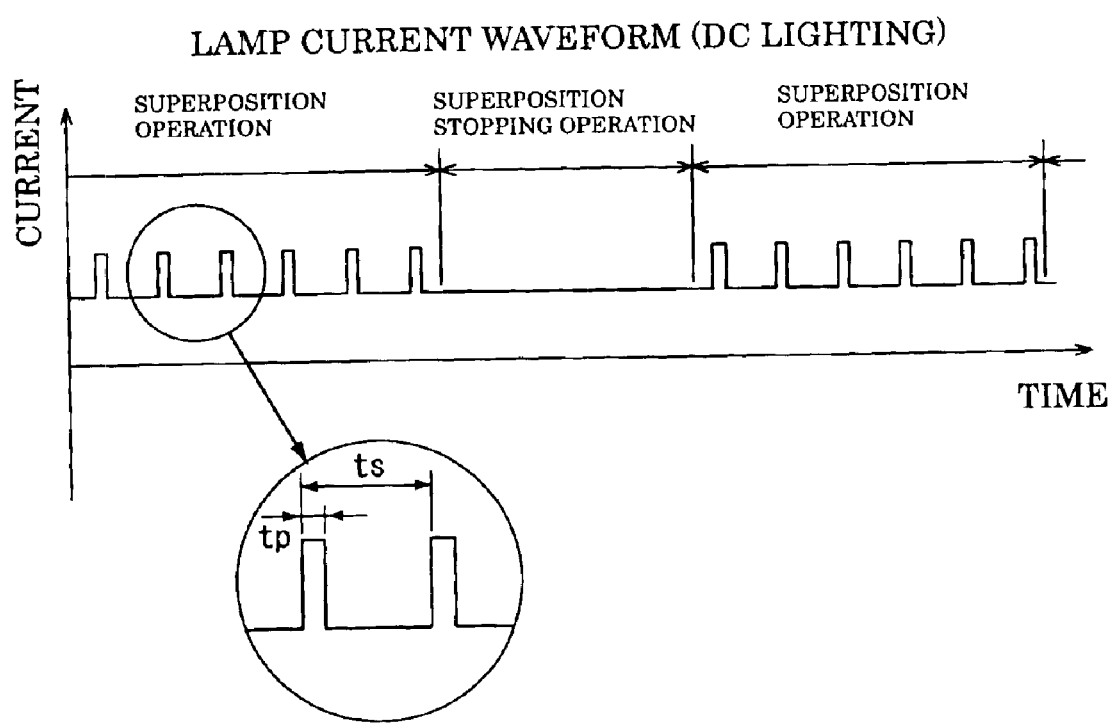
FIG. 3 is a graphic representation of the waveform of a lamp current (direct current) and that of a pulse current.

In turn, the arithmetic circuit 26 generates the instruction signal. Based on the instruction signal, a control signal is fed from the pulse width modulator circuit 16e to the switching element 16a. Based on the control signal, the ON/OFF operation of the switching element 16a is controlled to cause the current superposition operation and the current superposition stopping operation on the lamp current to be performed alternately with predetermined periodicity, as shown in FIG. 3.

Figure 4:
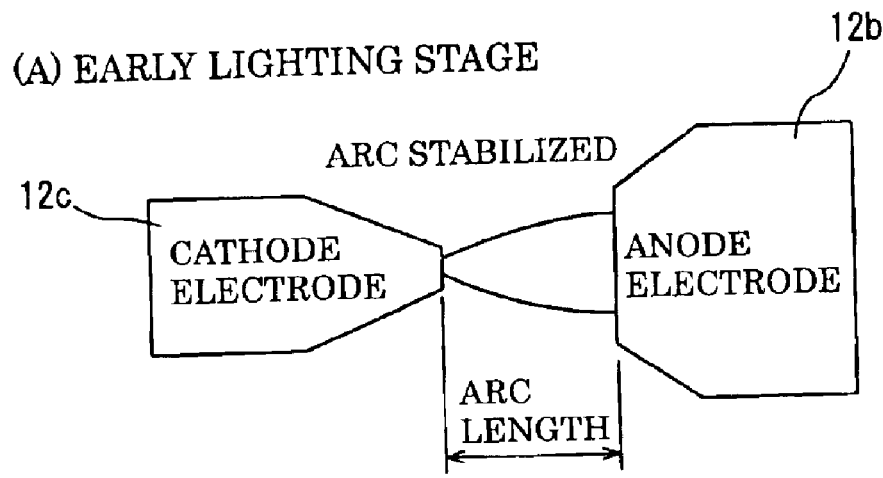
FIGS. 4(A), 4(B) and 4(C) are each a view illustrating the state of electrodes (DC lighting type)
Figure 4:
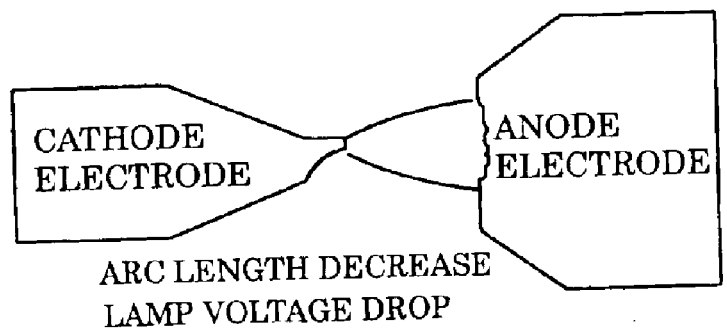
Figure 4:
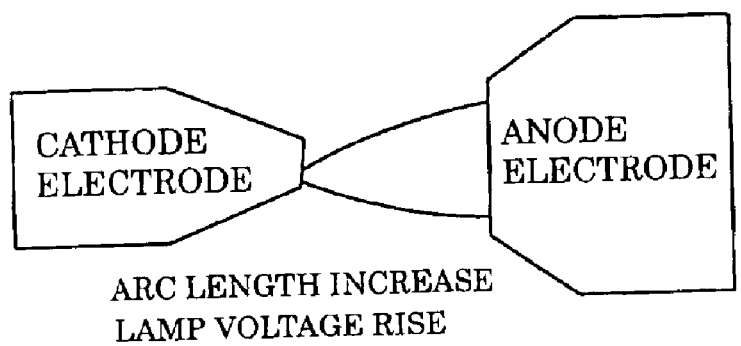

As shown in FIG. 4(A), in the early stage (early lighting stage) after the high pressure discharge lamp 12 in an unused state is turned on, the tip end of the cathode electrode 12c is flat. However, as shown in FIG. 4(B), as time lapses after the starting of the superposition operation, the tip end of the cathode electrode 12c grows to form a projection. Accordingly, the arc length is gradually shortened, while the lamp voltage gradually drops.

When the tip end of the cathode electrode 12c further grows to cause the lamp voltage to drop below the lower limit threshold value (e.g. 50V), that is, below a predetermined lower limit voltage value within a voltage range capable of keeping the lighting of the high pressure discharge lamp 12, the superposition operation is switched to the superposition stopping operation. As a result, the growing of the electrode stops and, hence, the dropping of the lamp voltage also stops. At that time, even when the superposition of the pulse current is stopped, there is no possibility that an arc jump occurs, because the tip end of the cathode electrode 12c has already grown to form a projection.

As shown in FIG. 4(C), during the superposition stopping operation, the tip end of the cathode electrode 12c is consumed due to evaporation of tungsten. Therefore, the arc length increases with time, accompanying a rise in the lamp voltage again. When the lamp voltage rises above the upper limit threshold value (e.g. 55V), that is, above a predetermined upper limit voltage value within a voltage range capable of preventing arc jump, the superposition of the pulse current is resumed.

As described above, in this embodiment, the switching element 16a, pulse width modulator circuit 16e, pulse generator circuit 24 and arithmetic circuit 26 serve as pulse superposing means for superposing the pulse current on the lamp current, and switching is performed between the pulse superposition operation and the pulse superposition stopping operation. With this arrangement, it is possible to prolong the lifetime of the high pressure discharge lamp 12 and to realize stabilized lighting throughout the lifetime.

The inventors examined the practicability of the present invention by the following experiment.

[Experimental Method]

As a high pressure discharge lamp, an ultra-high pressure mercury lamp having a rated power of 270 W (bulb outer diameter=1.2 mm, arc length=1.3 mm, internal pressure in lighting=about 15 MPa) was prepared. Comparison as to luminance maintaining ratio was made between the case where the ultra-high pressure mercury lamp was lighted using the lighting device of the present invention and the case where the lamp was lighted using a prior art lighting device. For the lighting device of the present invention and that of the prior art, the following devices were used.

The lighting device of the present invention: a device adapted to repeat alternately the superposition operation using a pulse current meeting the conditions: pulse height= 130%, pulse frequency=220 Hz, pulse width=0.65 msec and pulse power=11 W (about 4% of rated power) and the superposition stopping operation.

The prior art lighting device: a device adapted to continue only the superposition operation using a pulse current meeting the conditions: pulse height=130%, pulse frequency= 220 Hz, pulse width=0.65 msec and pulse power=11 W (about 4% of rated power).

[Experimental Result]

Figure 5:
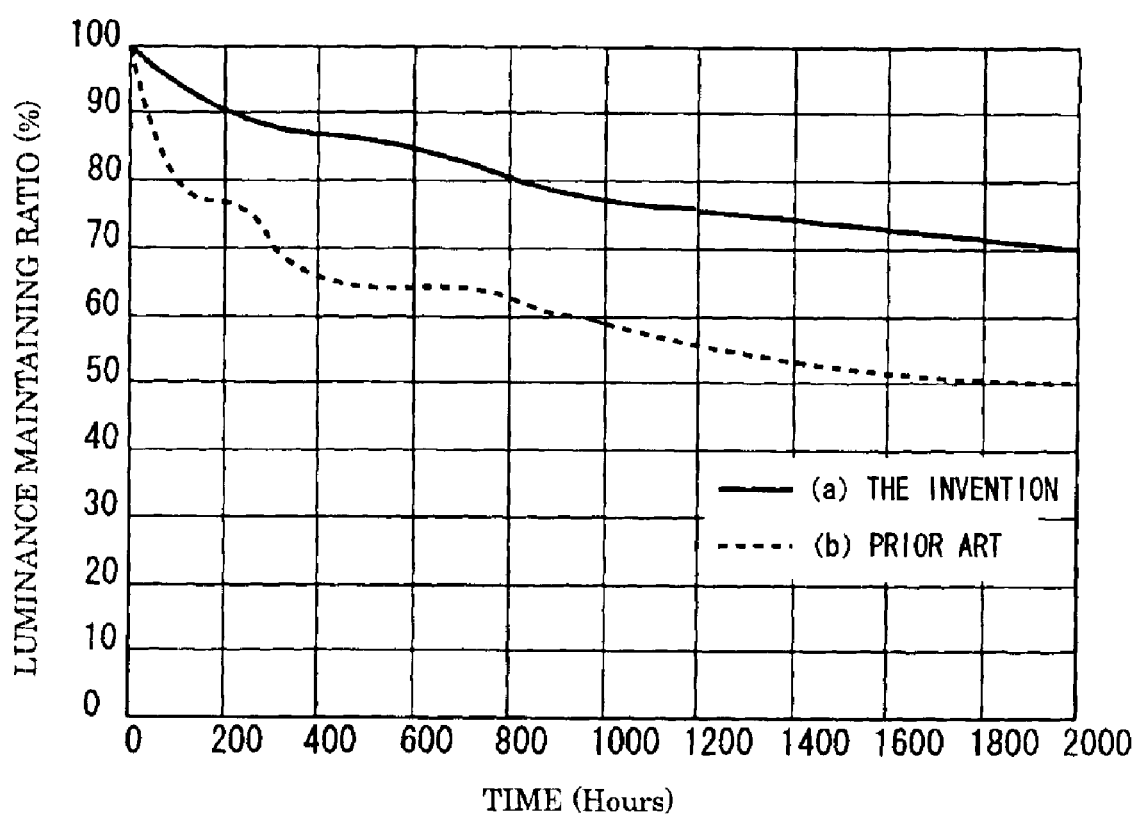
FIG. 5 is a graphic representation of the relationship between elapsed time and luminance maintaining ratio.

The experimental result is given in FIG. 5 as a graph plotting the relationship between luminance maintaining ratio and time.

As seen from the graph, the lighting device according to the present invention was capable of maintaining the luminance at a higher level than the prior art lighting device.

In the embodiment described above, the switching between the superposition operation and the superposition stopping operation is performed based on the lower limit threshold value (e.g. 50V) and the upper limit threshold value (e.g. 55V). However, an alternative configuration is possible wherein: respective time periods taken for the lower limit threshold value and the upper limit threshold value to be reached are determined in advance by experiment; switch timing signals are generated by counting the time periods with a timer; and the switching between the superposition operation and the superposition stopping operation is performed based on such switch timing signals.

Figure 6:
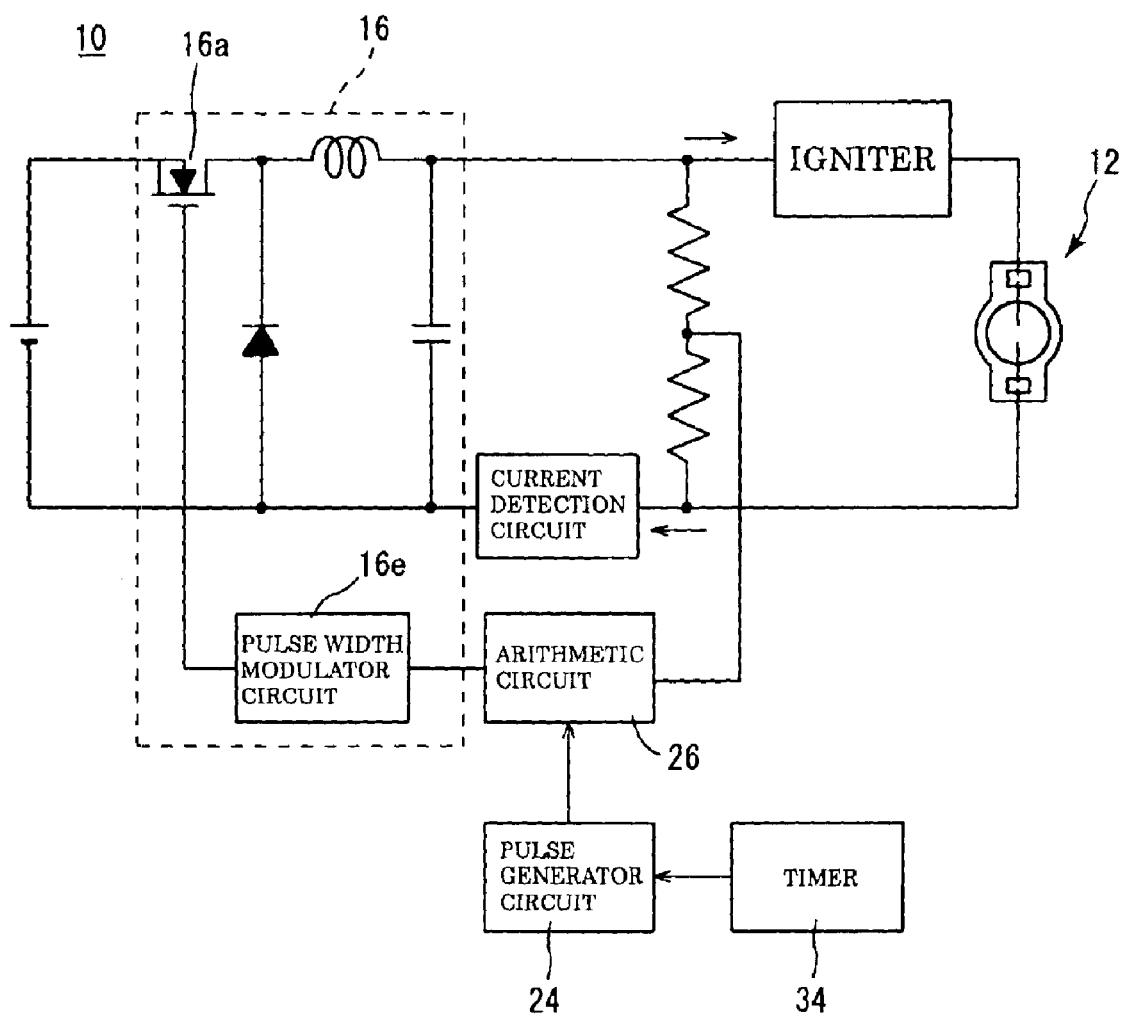
FIG. 6 is a block circuit diagram showing another embodiment (AC lighting type) of the present invention.

In such a case, the pulse ON/OFF circuit 28 in the above-described embodiment is replaced with a timer 34, as shown in FIG. 6. The timer 34 serves as the pulse ON/OFF means.

Figure 7:
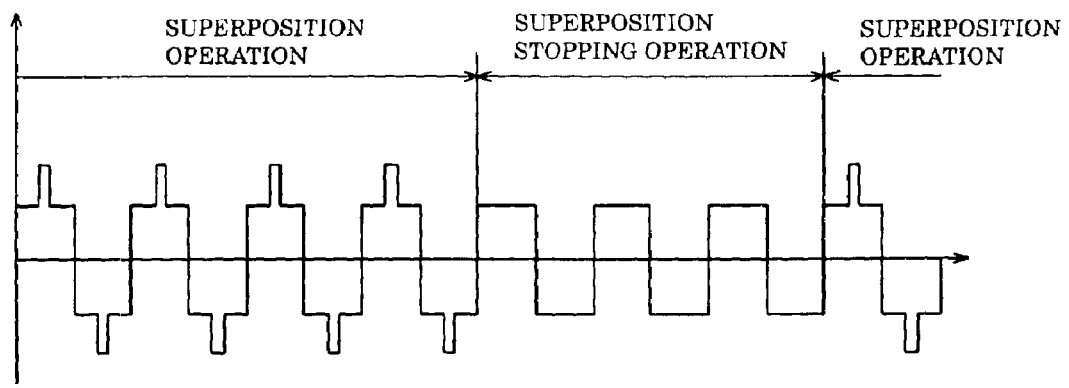
FIG. 7 is a graphic representation of the waveform of a lamp current (alternating current) and that of a pulse current.
Figure 8:
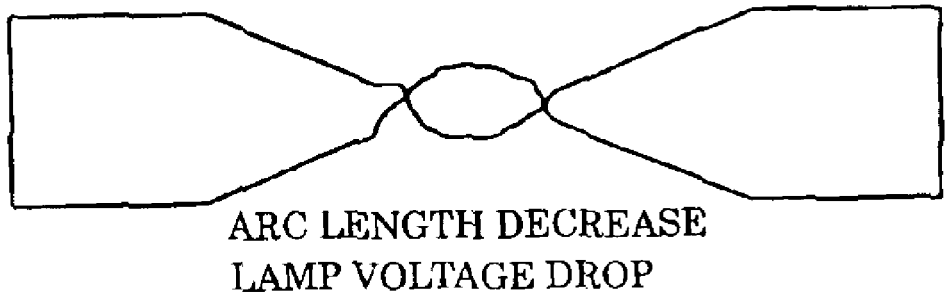
FIGS. 8(A) and 8(B) are each a view illustrating the state of electrodes (AC lighting type).
Figure 8:
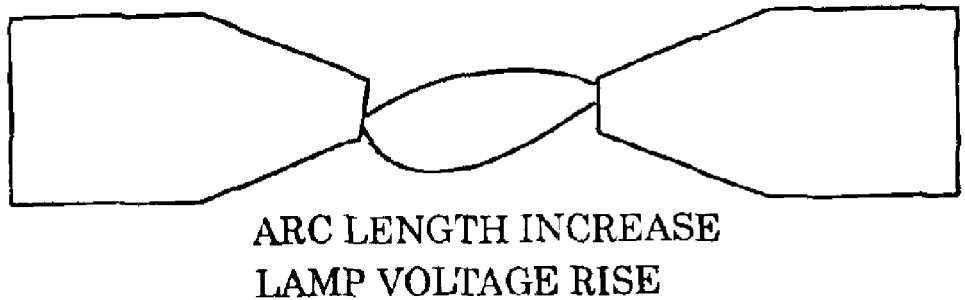

Further, although the present invention is applied to high pressure discharge lamp 12 of the DC lighting type in the above-described embodiment, the present invention may be applied to a high pressure discharge lamp of the AC lighting type. As shown in FIG. 7, in the case of such a high pressure discharge lamp of the AC lighting type, the superposition operation of superposing alternating pulse current on alternating lamp current and the superposition stopping operation are repeated alternately. In such a case, the phenomenon of electrode growth as shown in FIG. 8(A) occurs during the superposition operation, whereas the phenomenon of electrode consumption as shown in FIG. 8(B) occurs during the superposition stopping operation. By causing these phenomena to repeat alternately, the high pressure discharge lamp can enjoy a prolonged lifetime with stabilized arc.

According to the present invention, alternate repeating of the pulse superposition operation and the pulse super position stopping operation with predetermined periodicity makes it possible to prevent the electrode gap (arc length) from largely varying. Therefore, even when lighting is continued for a long time, it is possible to stabilize arc and prevent the luminance from deteriorating.

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. A method of steady state lighting a high pressure discharge lamp to maintain an arc discharge length within a discharge length range, comprising the steps of:
    monitoring a lamp voltage of the high pressure discharge lamp;
    determining if the lamp voltage falls to a lower limit threshold corresponding to a lower limit of the discharge length range and if the lamp voltage rises to an upper limit threshold corresponding to an upper limit of the discharge length range, wherein the upper limit threshold is higher than the lower limit threshold;
    applying a superposition operation for superposing a pulse current on a lamp current applied to the high pressure discharge lamp when it is determined that the lamp voltage has risen to the upper limit threshold;
    applying a superposition stopping operation for stopping the superposition of the pulse current when it is determined that the lamp voltage has dropped to the lower limit threshold; and repeating the above steps.

2. A device for steady state lighting a high pressure discharge lamp and maintaining an arc discharge length within a discharge length range, comprising:
    a power source for supplying a lamp current to the high pressure discharge lamp;
    pulse superposing means for controlling the power source to supply the lamp current and to superpose a pulse current on the lamp current during steady state lighting; and
    pulse ON/OFF means for determining when the lamp voltage rises to an upper limit threshold corresponding to an upper limit of the discharge length range and when the lamp voltage falls to a lower limit threshold corresponding to a lower limit of the discharge length range, wherein the upper limit threshold is higher than the lower limit threshold, and controlling the pulse superposing means to alternately perform a pulse superposition operation superposing the pulse current on the lamp current during steady state lighting when the lamp voltage rises to the upper threshold limit and a pulse superposition stopping operation ceasing the superposing the pulse current on the lamp current during steady state lighting when the lamp voltage falls to the lower limit threshold.

3. The device of claim 2 wherein the pulse superposing means includes:
    a pulse switching circuit monitoring the lamp voltage and determining when the lamp voltage falls to the lower threshold limit and when the lamp voltage rises to the upper threshold limit;
    a pulse generator, responsive to the pulse switching circuit, for generating a pulse signal when the pulse switching circuit determines the lamp voltage has risen to the upper threshold limit and ceasing generating the pulse signal when the pulse switching circuit determines the voltage has fallen to the lower threshold limit; and
    an arithmetic circuit, responsive to the lamp current, the lamp voltage and the pulse signal, for controlling the power source to supply lamp current based on the lamp current and the lamp voltage and to superpose the pulse current on the lamp current based on the pulse signal.

4. A device for steady state lighting a high pressure discharge lamp and maintaining an arc discharge length within a discharge length range, comprising:
    a power source for supplying a lamp current to the high pressure discharge lamp;
    pulse superposing means for superposing a pulse current on the lamp current during steady state lighting; and
    pulse ON/OFF means for controlling the pulse superposing means to alternately perform a pulse superposition operation superposing the pulse current on the lamp current during steady state lighting to reduce the arc discharge length and a pulse superposition stopping operation ceasing the superposing the pulse current on the lamp current to allow the arc discharge length to increase during steady state lighting based on predetermined pulse on and pulse off periods such that the arc discharge length remain within the discharge length range.

5. The device of claim 4 wherein the pulse superposing means includes:
    a timer counter circuit generating the pulse on and pulse off periods;
    a pulse generator, responsive to the pulse on and pulse off periods, for generating a pulse signal during the pulse on period and ceasing generating the pulse signal during the pulse off period; and
    an arithmetic circuit, responsive to the lamp current, the lamp voltage and the pulse signal, for controlling the power source to supply lamp current based on the lamp current and the lamp voltage and to superpose the pulse current on the lamp current based on the pulse signal.

* * * * *